United States Patent
Lu et al.

(10) Patent No.: US 9,929,453 B2
(45) Date of Patent: Mar. 27, 2018

(54) BI-METALLIC NANOPARTICLES AS CATHODE ELECTROCATALYSTS

(71) Applicant: UChicago Argonne, LLC, Chicago, IL (US)

(72) Inventors: Jun Lu, Bolingbrook, IL (US); Khalil Amine, Oakbrook, IL (US); Xiaoping Wang, Naperville, IL (US); Xiangyi Luo, Westmont, IL (US); Deborah J. Myers, Lisle, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 532 days.

(21) Appl. No.: 14/450,772

(22) Filed: Aug. 4, 2014

(65) Prior Publication Data

US 2016/0036108 A1    Feb. 4, 2016

(51) Int. Cl.
| | |
|---|---|
| H01M 4/92 | (2006.01) |
| H01M 4/38 | (2006.01) |
| H01M 12/08 | (2006.01) |
| H01M 4/90 | (2006.01) |
| H01M 4/86 | (2006.01) |

(52) U.S. Cl.
CPC .......... *H01M 12/08* (2013.01); *H01M 4/382* (2013.01); *H01M 4/9041* (2013.01); *H01M 4/921* (2013.01); *H01M 4/926* (2013.01); *H01M 4/381* (2013.01); *H01M 2004/8689* (2013.01); *H01M 2300/0028* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 2009/0123813 A1 | 5/2009 | Chiang et al. | |
| 2009/0326262 A1* | 12/2009 | Wan | C07F 9/3813 562/17 |
| 2010/0177462 A1* | 7/2010 | Adzic | B82Y 30/00 361/502 |
| 2011/0245068 A1* | 10/2011 | Stamenkovic | H01M 4/921 502/101 |
| 2011/0274989 A1 | 11/2011 | Lu et al. | |
| 2012/0183869 A1 | 7/2012 | Jin et al. | |
| 2012/0237838 A1* | 9/2012 | Uesaka | H01M 12/08 429/405 |
| 2013/0059231 A1* | 3/2013 | Hwang | H01M 4/9041 429/524 |

* cited by examiner

*Primary Examiner* — Rena Dye Cronin
(74) *Attorney, Agent, or Firm* — Foley & Lardner LLP

(57) ABSTRACT

A lithium-air battery cathode catalyst includes core-shell nanoparticles on a carbon support, wherein: a core of the core-shell nanoparticles is platinum metal; and a shell of the core-shell nanoparticles is copper metal; wherein: the core-shell nanoparticles have a weight ratio of the copper metal to the platinum metal from about 4% to about 6% copper to from about 2% to about 12% platinum, with a remaining percentage being the carbon support.

13 Claims, 14 Drawing Sheets

BI-METALLIC NANOPARTICLES AS CATHODE ELECTROCATALYSTS

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to air cathode batteries. In particular, it is related to metal-air cathode batteries and catalysts for the air cathode.

BACKGROUND

Lithium-air cells, which use the porous carbon as their cathode material, can be considered the 'holy grail' of lithium batteries because they offer, in principle, a significantly superior theoretical gravimetric energy density approaching that of gasoline. It is this exceptional energy potentiality that has triggered the worldwide interest in such batteries.

A reversible, non-aqueous Li-air battery uses a lithium metal anode, a liquid organic electrolyte, and a carbon-supported metal-based catalyst air cathode. Li-air cells differ from conventional battery systems such as lead-acid, nickel-metal hydride, and lithium-ion systems, because oxygen is supplied as a fuel to the cell during discharge. During operation, the lithium metal anode releases an electron to the external circuit producing lithium ions in the electrolyte as the oxygen is reduced at the cathode surface to form lithium peroxide ($Li_2O_2$), lithium oxide ($Li_2O$), or a combination thereof.

Among the major challenges for the development of Li-air batteries is finding solutions to the large charge overpotential and the irreversibility of $Li-O_2$ reactions. Several types of catalysts, including metals, metal complexes, and metal oxides, have been examined for the electrochemical reactions in the Li-air cells, showing large differences in charge potential and capacity among different catalysts. However, in general, these charge potentials are still too high (>3.8V) for practical use of the Li-air battery.

SUMMARY

In one aspect, a metal-air battery cathode catalyst includes core-shell nanoparticles on a carbon support. In the core-shell nanoparticles, a core of the core-shell nanoparticles includes platinum metal and a shell of the core-shell nanoparticles includes copper metal, wherein the core-shell nanoparticles have a weight ratio of the copper metal to the platinum metal from about 4% to about 6% copper to from about 2% to about 12% platinum, with a remaining percentage being the carbon support. In some embodiments, the ratio is from about 4% to about 6% copper to about 2% to about 12% platinum. In some embodiments, the ratio is about 5 wt % copper:about 2.5 wt % platinum. In some embodiments, the ratio is about 5 wt % copper:about 5 wt % platinum. In some embodiments, the ratio is about 5 wt % copper:about 10 wt % platinum.

The metal-air cathode catalyst may be a catalyst for a lithium-air battery, a sodium-air battery, a potassium-air battery, a magnesium-air battery, or a zinc-air battery. In some embodiments, the metal-air battery is a lithium-air battery.

In one aspect, a metal-air battery is provided, the battery including an anode, a cathode catalyst, and an electrolyte, wherein the cathode catalyst includes core-shell nanoparticles on a carbon support, wherein a core of the core-shell nanoparticles comprises platinum metal, and a shell of the core-shell nanoparticles includes copper metal, wherein the core-shell nanoparticles have a weight ratio of the copper metal to the platinum metal from about 4% to about 6% copper to from about 2% to about 12% platinum, with a remaining percentage being the carbon support. In some embodiments, the ratio is from about 4% to about 6% copper to about 2% to about 12% platinum. In some embodiments, the ratio is about 5 wt % copper:about 2.5 wt % platinum. In some embodiments, the ratio is about 5 wt % copper:about 5 wt % platinum. In some embodiments, the ratio is about 5 wt % copper:about 10 wt % platinum.

The metal-air batteries may be lithium-air batteries, sodium-air batteries, potassium-air batteries, magnesium-air batteries, or zinc-air batteries. In some embodiments, the metal-air battery is a lithium-air battery.

DETAILED DESCRIPTION

Figure 1:
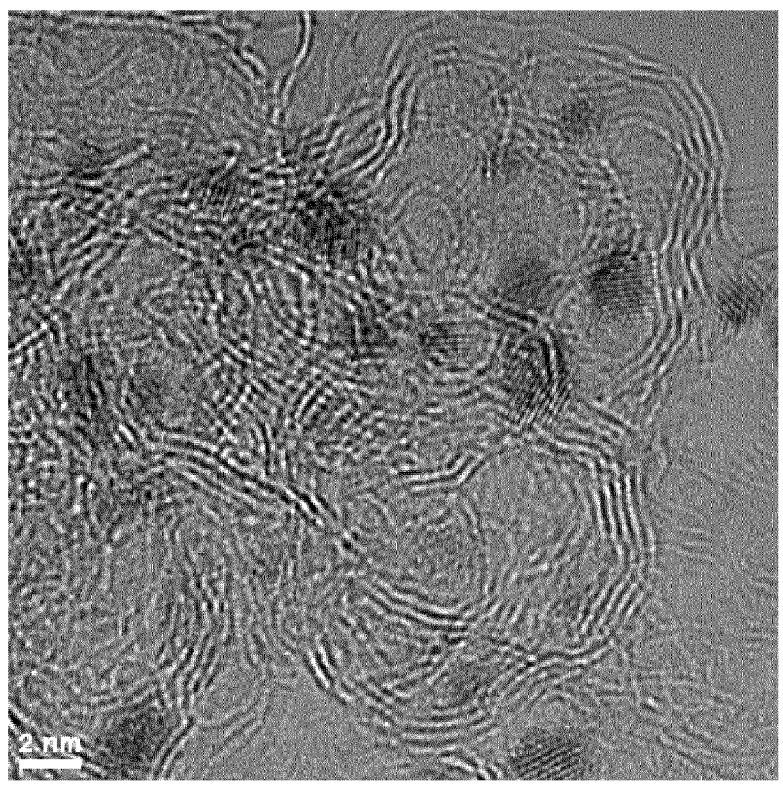
FIG. 1 is a high-resolution transmission electron microscopy (HRTEM) image, of 2.5% platinum-5% copper core-shell nanoparticles on a carbon substrate, according the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. For example, about 5 wt % may mean from 4.5 wt % to 5.5 wt %.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Metal-air batteries, where a metal is the anode active material and air is the cathode active material, are provided. Such batteries include where the metal is lithium, sodium, potassium, magnesium, or zinc. The batteries employ a bi-metallic nanparticulate catalysts to assist in the reduction of $O_2$ at the cathode. The bi-metallic catalysts have a core-shell structure that have a shell of copper metal and a core of platinum metal. The present inventors have found that such core-shell nanoparticulate materials significantly reduce the battery overpotentials that are observed. In some embodiments, the overpotential of a battery employing the catalysts is on the order of about 0.2 V. In comparison, carbon cathodes, carbon with copper cathodes, or carbon with platinum cathodes (i.e. the materials individually) exhibit a significantly larger overpotential on the order of about 1.0 V. Without being bound by theory, it is believes that the Pt core stabilizes $Cu^+$ species within the shell, and the $Cu^{1+}$ acts as the catalyst for the OER (oxygen evolution reaction) in the metal-air, or lithium-air cells to lower the charge potential. Accordingly, in some embodiments, the shell may contain $Cu^{1+}$ as an active species. Further, during operation of a battery incorporating the cathode catalyst material, at least some of the copper may be present as $Cu^{1+}$.

As noted above, the cathode catalyst material include a core-shell nanoparticle. The nanoparticles may be sequestered on a carbon support to provide a substrate on which to disperse the nanoparticles. The carbon supports also provide high surface area to assist in air contact with the cathode catalysts. The carbon support material may be a carbon material that does not interfere with the operation of the catalyst or the batteries. Illustrative carbon supports include, but are not limited to, comprises synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene.

The core-shell nanoparticles have a platinum metal core and a copper metal shell. The nanoparticles may have from about 4 wt % to about 6 wt % copper metal as the shell. The nanoparticles may also have from about 2 wt % to about 12 wt % platinum metal as the core. The wt % of the copper and platinum are based upon the total mass of the nanoparticles and the carbon support material. This includes embodiments, where the nanoparticles have from about 4.5 wt % to about 6 wt % copper. This also includes embodiments where the nanoparticles have about 5 wt % copper metal. The wt % also includes where the platinum is present at about 2.5 wt % to about 10 wt %. In any of the above embodiments, a ratio of the platinum metal to copper metal in the core-shell nanoparticles may be about 2 wt % to about 12 wt % platinum to about 4 wt % to about 6 wt % copper. In any of the above embodiments, a ratio of the platinum metal to copper metal in the core-shell nanoparticles may be about 2.5 wt % platinum to about 5 wt % copper. In any of the above embodiments, a ratio of the platinum metal to copper metal in the core-shell nanoparticles may be about 5 wt % platinum to about 5 wt % copper. In any of the above embodiments, a ratio of the platinum metal to copper metal in the core-shell nanoparticles may be about 10 wt % platinum metal to about 5 wt % copper.

As noted, the core-shell copper platinum materials are nanoparticulate. Accordingly, the average diameter of the nanoparticles may be from about 1 nm to about 100 nm, inclusive. In any of the above embodiment, the nanoparticles may have an average diameter from 2 nm to about 10 nm, inclusive.

In another aspect, a metal-air battery is provided. The batteries include an an anode, a cathode catalyst, and an electrolyte. The cathode catalyst may be any of the core-shell nanoparticles described above on a carbon support material. The carbon support material for the cathode catalyst may be any of the carbon support materials described herein.

The anode of the batteries may be a lithium foil, lithium mesh, lithium nanoparticles, lithiated carbon, lithiated tin, lithiated silicon, a sodium foil, sodium mesh, sodium nanoparticles, sodiated carbon, sodiated tin, sodiated silicon, a potassium foil, potassium mesh, potassium nanoparticles, potassiated carbon, potassiated tin, potassiated silicon, a magnesium foil, magnesium ribbon, magnesium mesh, magnesium nanoparticles, magnesiated carbon, magnesiated tin, magnesiated silicon, a zinc foil, a zinc ribbon, zinc mesh, zinc nanoparticles, zincated carbon, zincated, tin, or zincated silicon. In some embodiments, the metal-air battery is a lithium-air battery, accordingly, the anode includes a lithium foil, lithium mesh, lithium nanoparticles, lithiated carbon, lithiated tin, or lithiated silicon. In other embodiments, the metal-air battery is a lithium-air battery, accordingly, the anode includes a lithium foil, lithium mesh, or lithium nanoparticles.

The anode may also include a current collector to efficiently capture the charge through a load. The current collector may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen.

The electrolytes for use in the metal-air batteries include an aprotic solvent and a salt. The aprotic solvents include ether-based, fluorinated ether-based, and oligo(ethylene oxide) solvents. Illustrative solvents include, but are not limited to glyme, diglyme, tetrahydrofuran, tetraethylene glycol dimethylether, tri(ethylene glycol)-substituted methyltrimethyl silane (1NM3), ethylene glycol-substituted methyltrimethyl silane (1NM1), and di(ethylene glycol)-substituted methyltrimethyl silane (1NM2). Other illustrative solvents include, but are not limited to, solvents such as acetonitrile (ACN), dimethyl sulfoxide (DMSO), dimethyl-formamide (DMF), triethyl phosphate, N,N-dimethylacet-amide (DMA), N-methyl pyrrolidone (NMP), methoxybenzene, and ionic liquids. It is noteworthy that carbonate solvents are absent from this listing.

Illustrative salts for use in the electrolytes include, but are not limited to, lithium salts such as $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

The present invention, thus generally described, will be understood more readily by reference to the following examples, which are provided by way of illustration and are not intended to be limiting of the present invention.

EXAMPLES

Example 1

Preparation and characterization of a Cu—Pt/C cathode. Well-dispersed and uniform Cu—Pt particles were prepared over on Vulcan® XC-72 carbon (available from Cabot Corporation, Boston, Mass.) by a wet-chemistry method.

Core-shell nanoparticles of two different metals can be prepared by two different techniques: the colloidal technique and the strong electrostatic technique.

Colloidal Technique. The colloidal technique involves the reduction of organic-ligand functionalized metal precursors. The metal core precursor is functionalized with a long alkyl chain ligand such as decanethiol, in the presence of a phase transfer agent, to render it soluble in the organic phase of a mixed organic-aqueous solvent. A reducing agent is then introduced to reduce the ligand-functionalized metal precursor to a ligand-encapsulated metal particle of approximately 2-nm diameter. The ligand-encapsulated particle is then adsorbed onto the carbon support and the supported metal heat-treated to remove the encapsulating ligand shell. The organic encapsulating shell serves to protect the metal nanoparticles from agglomeration during preparation, thus this technique results in a uniform and small metal particle size. This technique can involve either two phases, where the reducing agent (e.g., borohydride) is introduced in an aqueous phase and transferred to the organic phase using a phase transfer agent, or a single organic phase with an organic reducing agent.

The advantage of the colloidal precursor method over traditional support impregnation or co-deposition techniques is that the synthesis of the metal nanoparticles is independent of the properties of the support. This allows tailoring of the size, size distribution, and composition of the nanoparticles prior to introduction onto the support and the metal particle surface can be coated, for example, by another metal. For example, it has been shown that core-shell nanoparticles can be formed by the electrolysis of organic ligand-stabilized core metal colloids using a shell metal sacrificial anode or by successive reduction of ligand-stabilized precursors.

The synthesis of layered metal nanoparticles is normally accomplished by the reduction of the shell metal ions in the presence of the core nanoparticles (seed-mediated growth process). This procedure results in the formation of metal nanoparticles of the second metal in addition to the layered nanostructures and is clearly an undesirable aspect of the procedure. One approach that is pursued to overcome this drawback is the synthesis of metal core nanoparticles stabilized with an organic monolayer shell containing a negatively charged moiety which, when exposed to the second metal ions, binds them, which will form the pure layered nanostructures when subsequently reduced.

Strong electrostatic adsorption. Small particles of Pt and other metals can be deposited on carbon supports using an impregnation method called "strong electrostatic adsorption." In this method, an aqueous solution containing a metal precursor is contacted with a support, and a surface charge on the support is induced by maintaining the pH either below or above the pH of zero charge of the support to either attract anionic or cationic or anionic precursors of the metals. For example, if the pH of the solution is maintained below the pH of zero charge for a carbon support, an anionic precursor of Pt, such as chloroplatinic acid $[PtCl_6]^{2-}$, can be used and if the solution is maintained above the pH of zero charge for the carbon support, a cationic precursor of Pt, such as platinum tetraammine, $[(NH_3)_4Pt]^{+2}$ can be used. Exposure of the charged support to a solution of the precursor results in adsorption of a monolayer of the precursor on the support, which can then be reduced to metal nanoparticles using a gas phase or solution phase reducing agent, such as hydrogen or sodium borohydride, respectively. Core-shell structures of one metal deposited on another can be achieved by using the SEA technique and subsequent reduction to form nanoparticles of one metal, followed by mild oxidation of the metal. The pH of the solution can then be tuned to be between the pH of zero charge of the metal oxide and the carbon support. In this way either the cationic or anionic form of the shell metal can be adsorbed selectively on the metal nanoparticles and not on the carbon support. This is then followed by either gas or solution phase reduction to reduce both the core and shell materials to their metallic forms.

Figure 2:
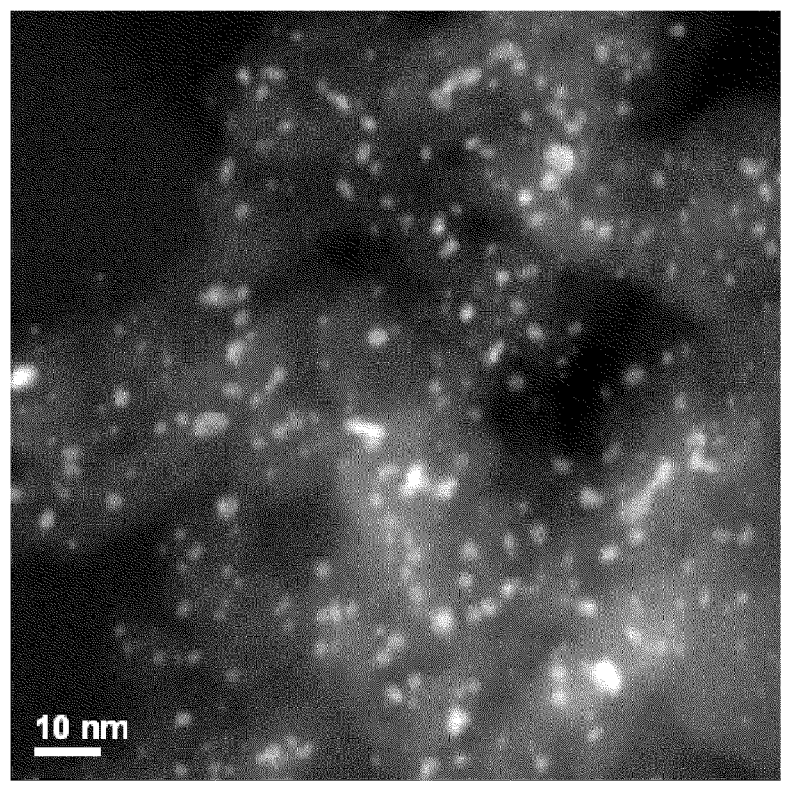
FIG. 2 is a scanning transmission electron microscopy (STEM) image, of 2.5% platinum-5% copper core-shell nanoparticles on a carbon substrate, according the examples.

High-resolution Transmission Electron Microscopy (TEM) shows that the size of the Cu—Pt nanoparticles on the carbon substrate is in the range of 2-10 nm. As shown in FIG. 1, the 5% Cu-2.5% Pt nanoparticles are around 2 nm in diameter, and are crystalline and faceted. In the Scanning Transmission Electron Microscopy (STEM) image in FIG. 2, the uniform distribution of the nanoparticles on the carbon substrate is exhibited. In addition, the STEM images, not provided, reveal that the nanoparticles have a core-shell structure, with a Pt-core surrounded by the Cu shell.

Without being bound by theory, it is believed that the shell-core Cu—Pt nanoparticles are uniformly dispersed on the porous carbon surface. These as-prepared Cu—Pt/C composites have a porous structure and high specific surface area, thereby providing a high number of active sites for $O_2$ absorption. This will enhance the catalytic activity for the oxygen reduction reaction (ORR), and the oxygen evolution reaction (OER), as we demonstrate below for an aprotic Li—$O_2$ cell.

Example 2

Reparation of an electrochemical cell. Swagelok-type cells with the cathode having 5% Cu-x % Pt (x=2.5, 5, 10) nanoparticles, from Example 1, were tested under 1 bar $O_2$ atmosphere with a battery and cell tester (MACCOR cycler). Tetraethylene glycol dimethylether (TEGDME) with $LiCF_3SO_3$ was selected as the electrolyte.

For comparison, control cells were also prepared containing a cathode having the same loading of carbon, carbon with 5% Cu, and carbon with 2.5% Pt. The control cells were tested under similar conditions, with the specific capacities normalized to the loading of the cathode material.

Example 3

Figure 3:
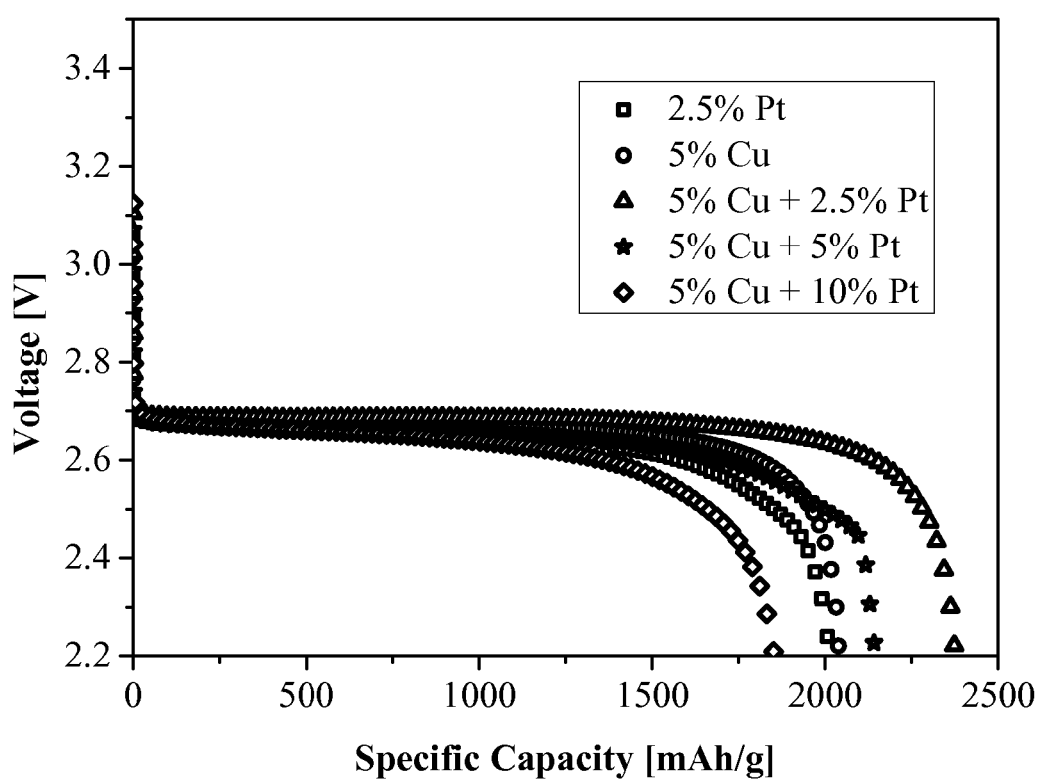
FIG. 3 is the x-ray diffraction (XRD) patterns of the discharged cathodes from the voltage profiles presented in FIG. 4.

Electrochemical cell performance. FIG. 3 shows voltage profiles of different cells after the first discharge to 2.2 V. The discharge reaction of all the tested cells take place in the range of 2.65-2.70 V, with the total specific capacity around 2000 mAh/g. The 5% Cu-2.5% Pt—C cathode has the highest discharge capacity. However, it seems not a substantial improvement of the discharge specific capacity.

Figure 4:
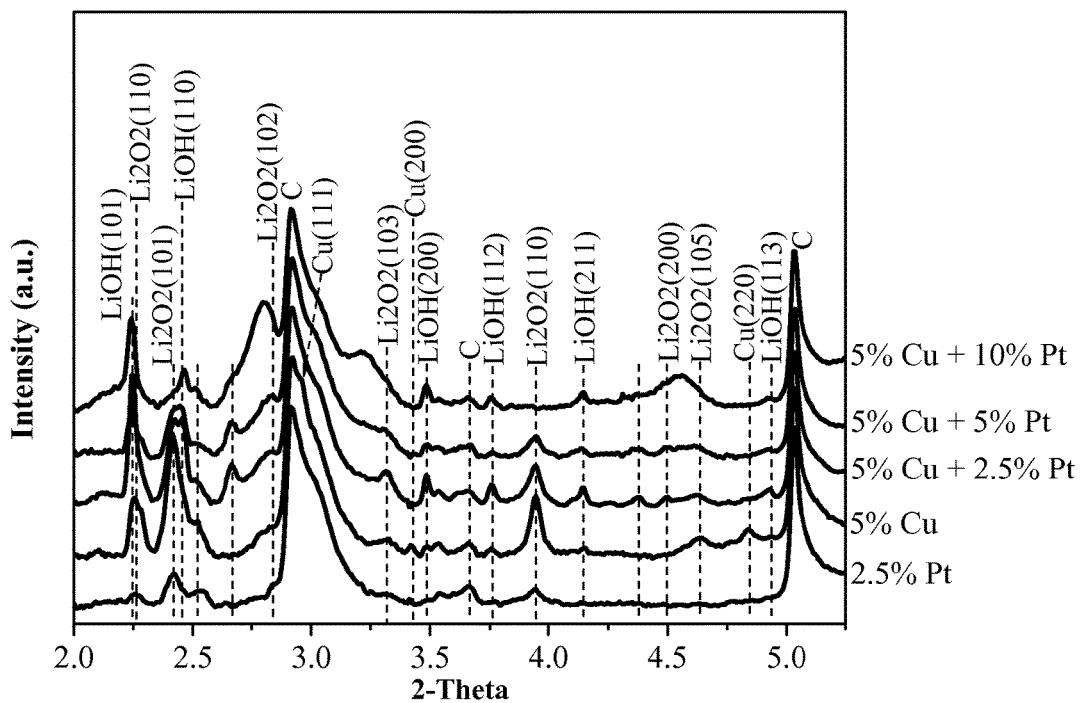
FIG. 4 is a voltage profile of discharged cells contains as the catalyst, 2.5% Pt, 5% Cu, 2.5% Pt-5% Cu, 5% Pt-5% Cu, or 10% Pt-5% Cu nanoparticles on carbon substrates, according the examples.

More differences shown in the discharge products, which were analyzed by x-ray diffraction (XRD) and scanning electron microscopy (SEM). The XRD results are presented in FIG. 4. The diffraction patterns of the discharged cathodes clearly show that $Li_2O_2$ is the main discharge product. A small amount of LiOH was also detected on the samples, which is likely due to hydrolysis of $Li_2O_2$ from adventitious water either remaining on the electrode, from the air during the XRD measurements, or from decomposition of electrolyte.

Figure 5:
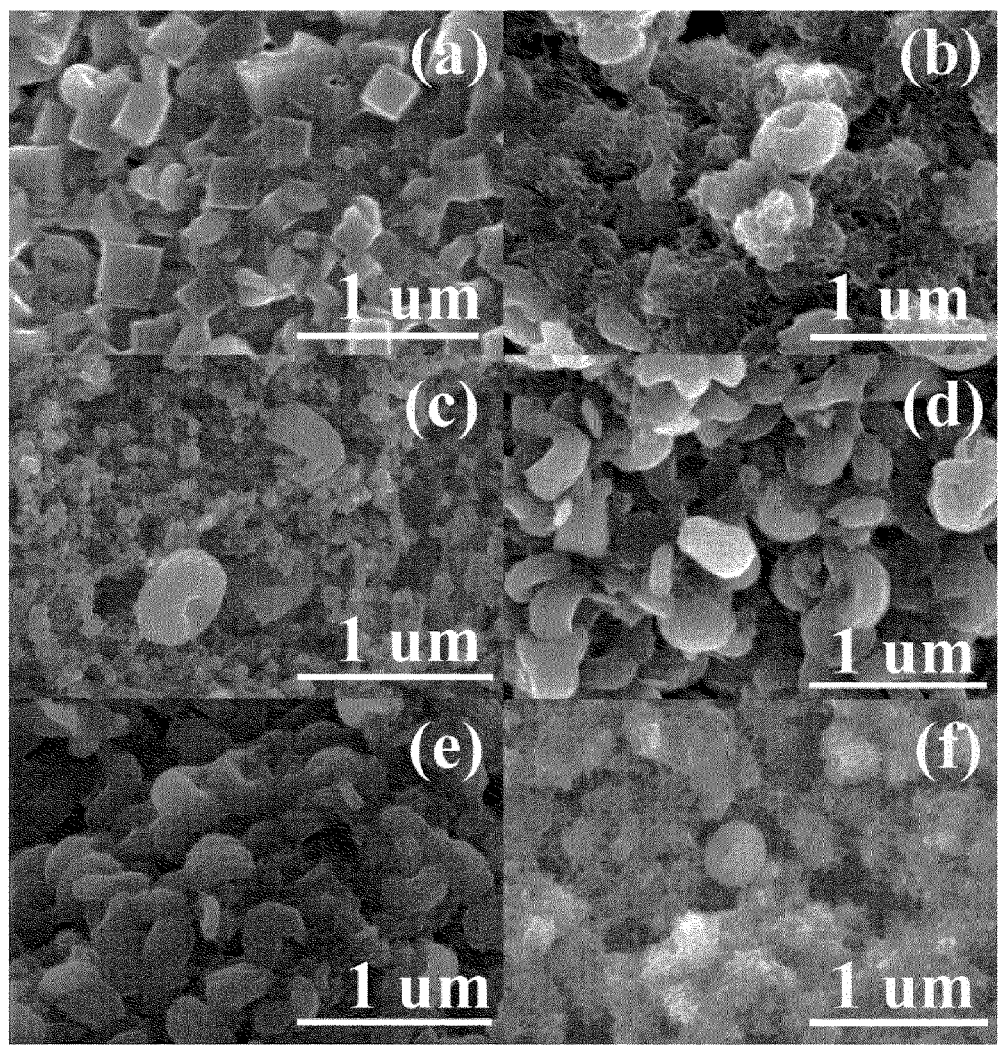
FIGS. 5(a)-5(f) are a scanning electron microscopy (SEM) images of: (a) a 2.5% Pt—C cathode discharged to 2.2 V; (b) a 5% Cu—C cathode discharged to 2.2 V; (c) a 5% Cu-2.5% Pt—C cathode discharged for 15 hours; (d) a 5% Cu-2.5% Pt—C cathode discharged to 2.2 V; (e) a 5% Cu-5% Pt—C cathode discharged to 2.2 V; (f) a 5% Cu-10% Pt—C cathode discharged to 2.2 V, according the examples.

Consistent with the XRD patterns, a toroid of $Li_2O_2$ is observed in the SEM images for all the discharged cathodes, as shown in FIG. 5. However, according to the SEM images, the $Li_2O_2$ toroid is the main discharge product only where the cathode is 5% Cu-2.5% Pt—C (FIGS. 5C and 5D) or 5% Cu-5% Pt—C (FIG. 5E). Amorphous products are observed for cathodes of 5% Cu—C (FIG. 5B) and 5% Cu-10% Pt—C (FIG. 5F). Cubes are the main discharge product for the 2.5% Pt—C cathode (FIG. 5A). These results indicate that the side reactions that impact such cathodes are significantly reduced by the 5% Cu-x % Pt (x=2.5, 5) nanoparticles.

Figure 6:
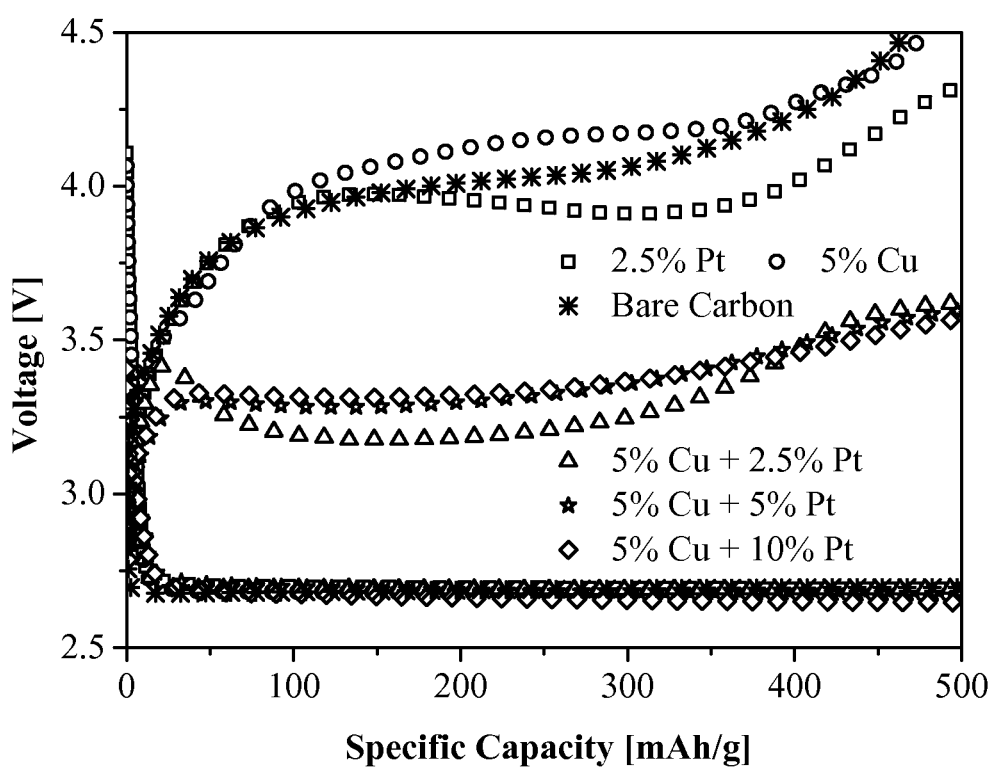
FIG. 6 is a voltage profile of the first cycle of cathodes comprised bare carbon; a 2.5% Pt—C cathode; a 5% Cu—C cathode; a 5% Cu-2.5% Pt—C cathode; a 5% Cu—5% Pt—C cathode; and a 5% Cu-10% Pt—C cathode, according the examples.
Figure 7:
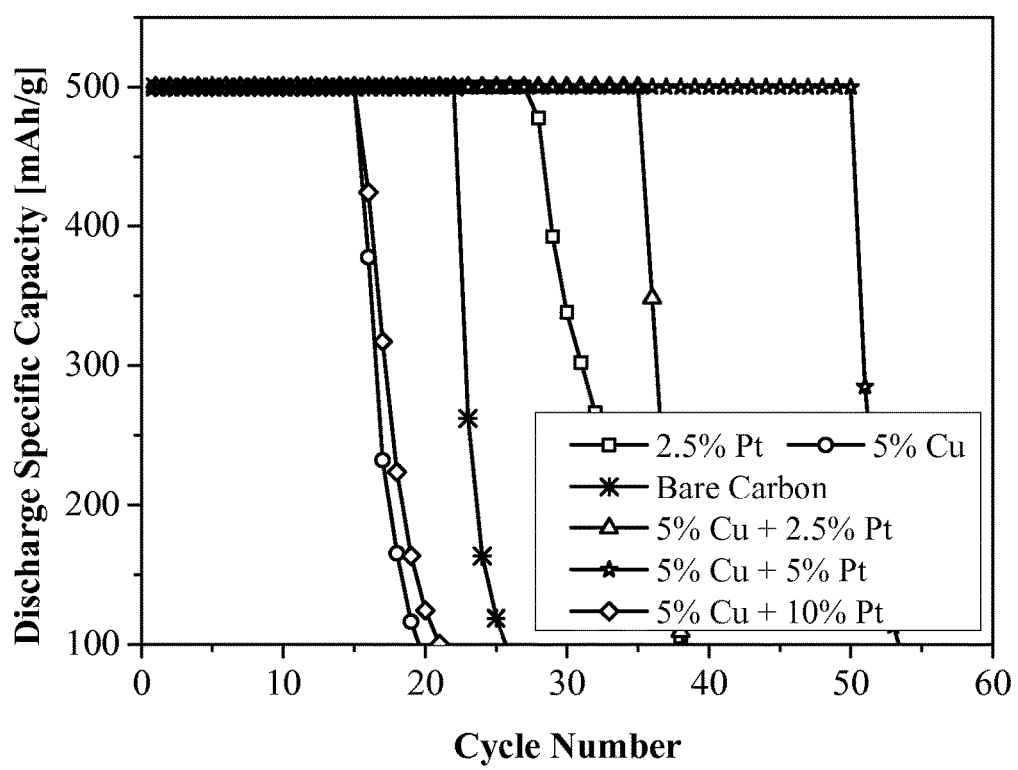
FIG. 7 is a graph of the cyclability of the cells in FIG. 6 under a 500 mAh/g capacity controlled mode, according the examples.

FIG. 6 illustrates the voltage profile of the first discharge/charge cycle obtained when the cells were subjected to discharge first. The cells were discharged to a capacity of 500 mAh/g and charged. The charge plateaus appears at approximately 3.2 V for the 5% Cu-2.5% Pt—C cathode and 3.3 V for the 5% Cu-x % Pt—C (x=5, 10) cathodes, while the charge potential of the carbon cathode and mono-metallic cathodes are around 4 V. The specific discharge capacity may be maintained for 50 cycles with the 5% Cu-5% Pt—C cathode, and for 35 cycles on the 5% Cu-2.5% Pt—C cathode as shown in FIG. 7. This is a significant improvement in cyclability, especially in comparison to the cycling ability of the other cathodes had less than 30 cycles.

Figure 8:
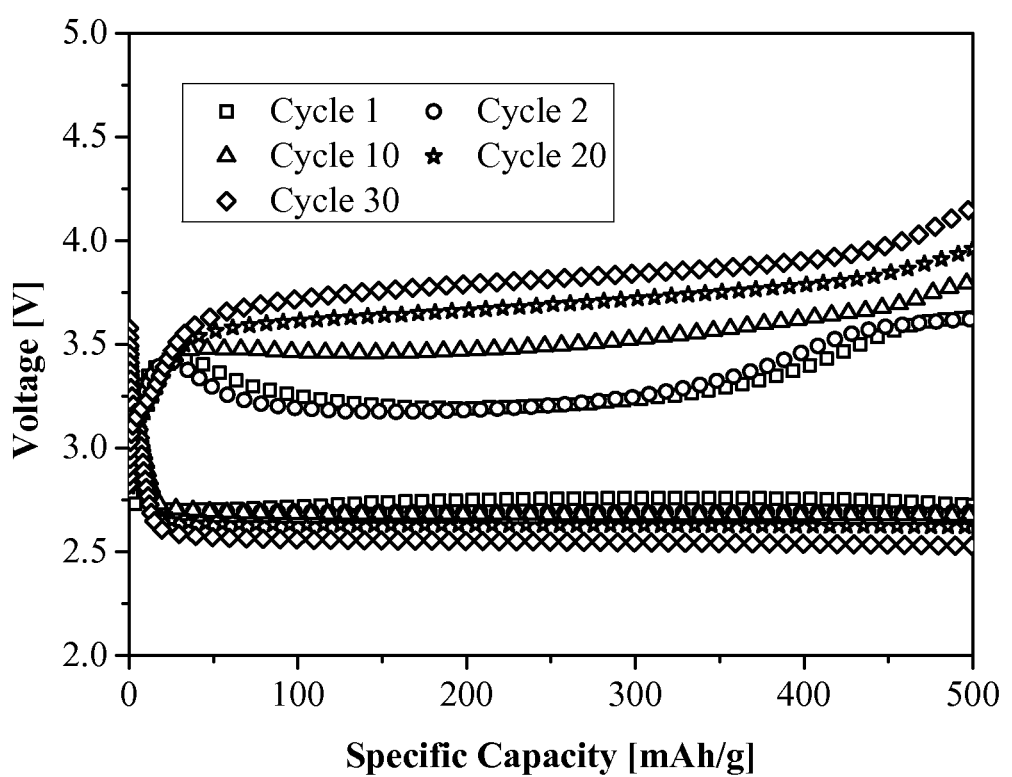
FIG. 8 is a detailed voltage profile of cells prepared with a cathode of 5% Cu-2.5% Pt—C under a 500 mAh/g capacity controlled mode, according the examples.
Figure 9:
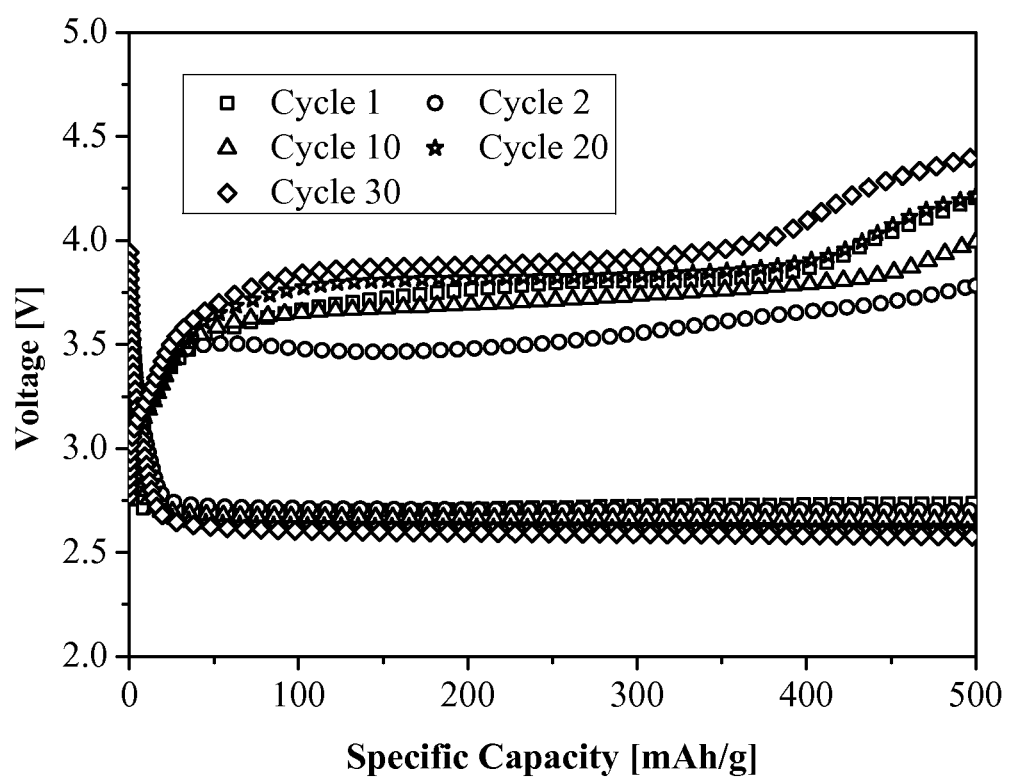
FIG. 9 is a detailed voltage profile of cells prepared with a cathode of 5% Cu-5% Pt—C under a 500 mAh/g capacity controlled mode, according the examples.
Figure 10:
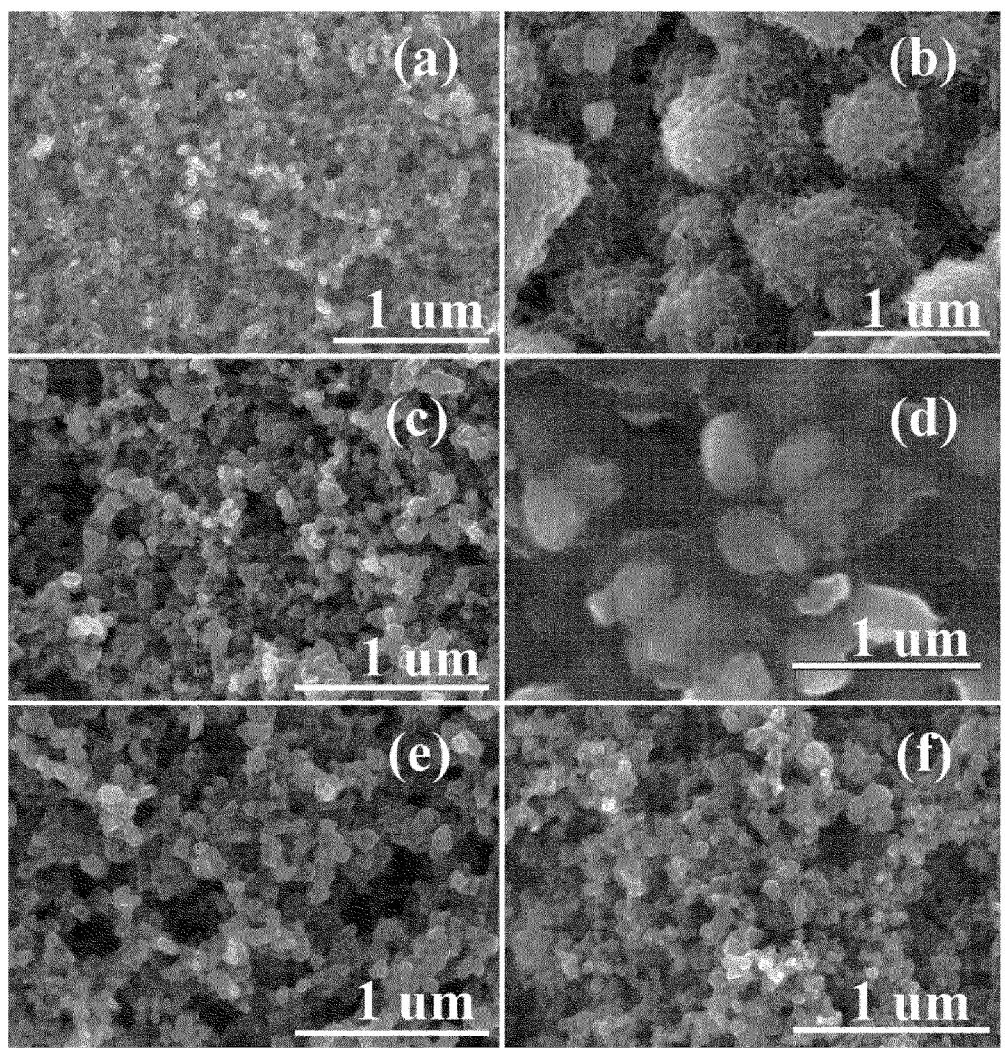
FIGS. 10(a)-10(f) are a scanning electron microscopy (SEM) images of: (a) pristine cathode, and (b)-(f) cathodes after the discharge-charge cycles of: (b) bare carbon, (c) 2.5% Pt—C, (d) 5% Cu—C, (e) 5% Cu-2.5% Pt—C, and (f) 5% Cu-5% Pt—C, according the examples.
Figure 11:
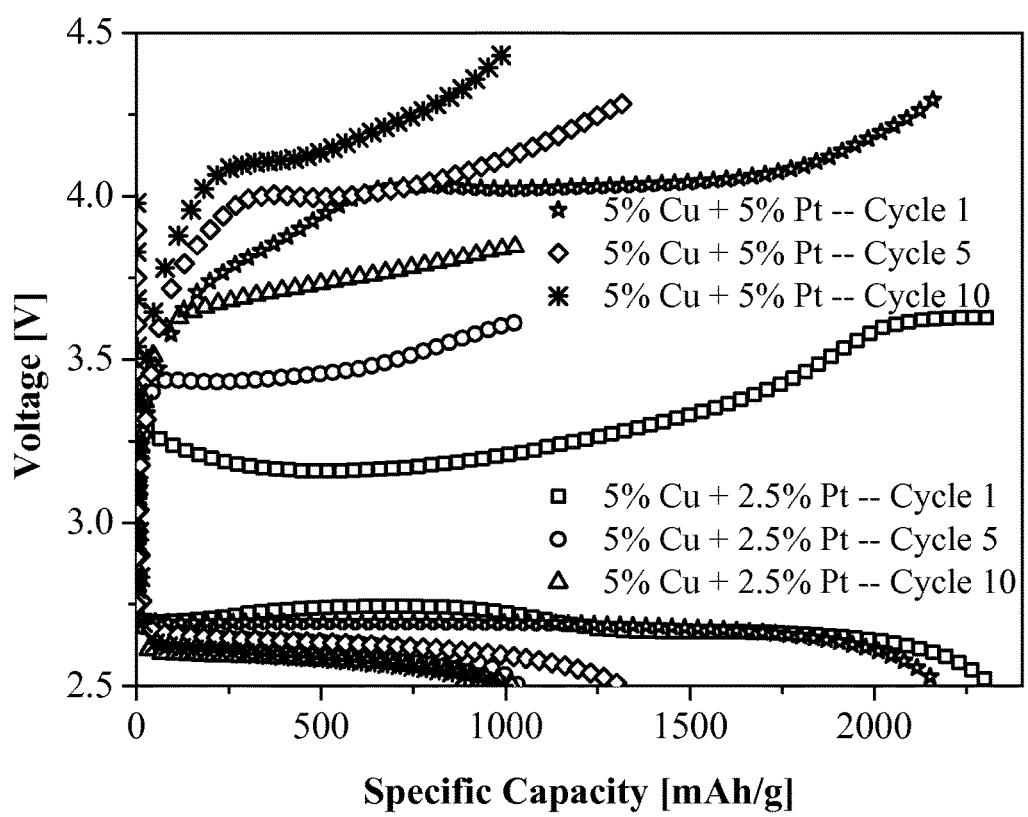
FIG. 11 is a voltage profile of the first cycle, under voltage-controlled mode, of cathodes comprised of 5% Cu-2.5% Pt—C and 5% Cu-5% Pt—C, according the examples.
Figure 12:
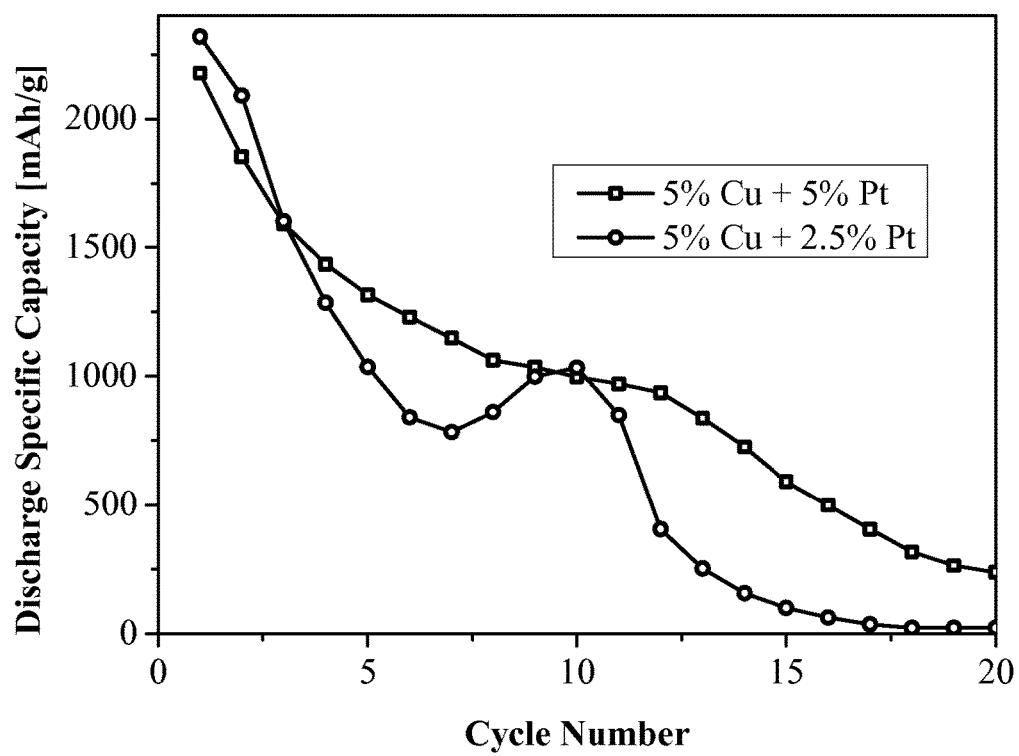
FIG. 12 is a graph of the cyclability, under voltage-controlled mode, of the cells in FIG. 11, according the examples.
Figure 13:
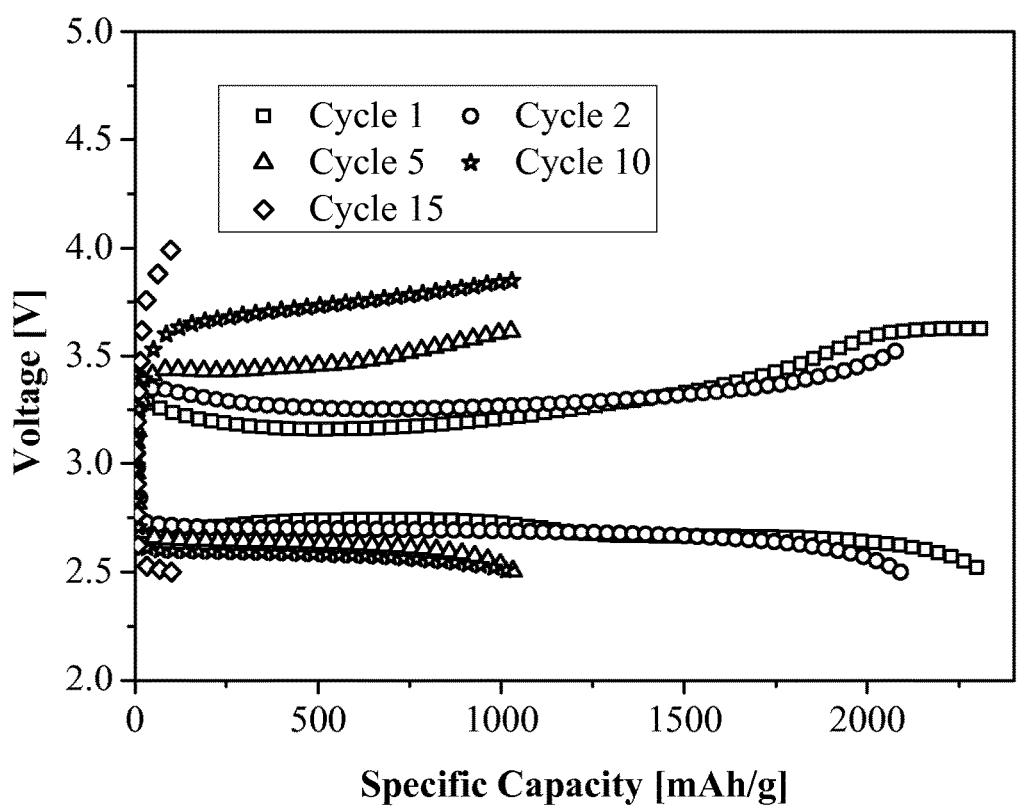
FIG. 13 is a detailed voltage profile of cells, under voltage-controlled mode, prepared with a cathode of 5% Cu-2.5% Pt—C, according the examples.
Figure 14:
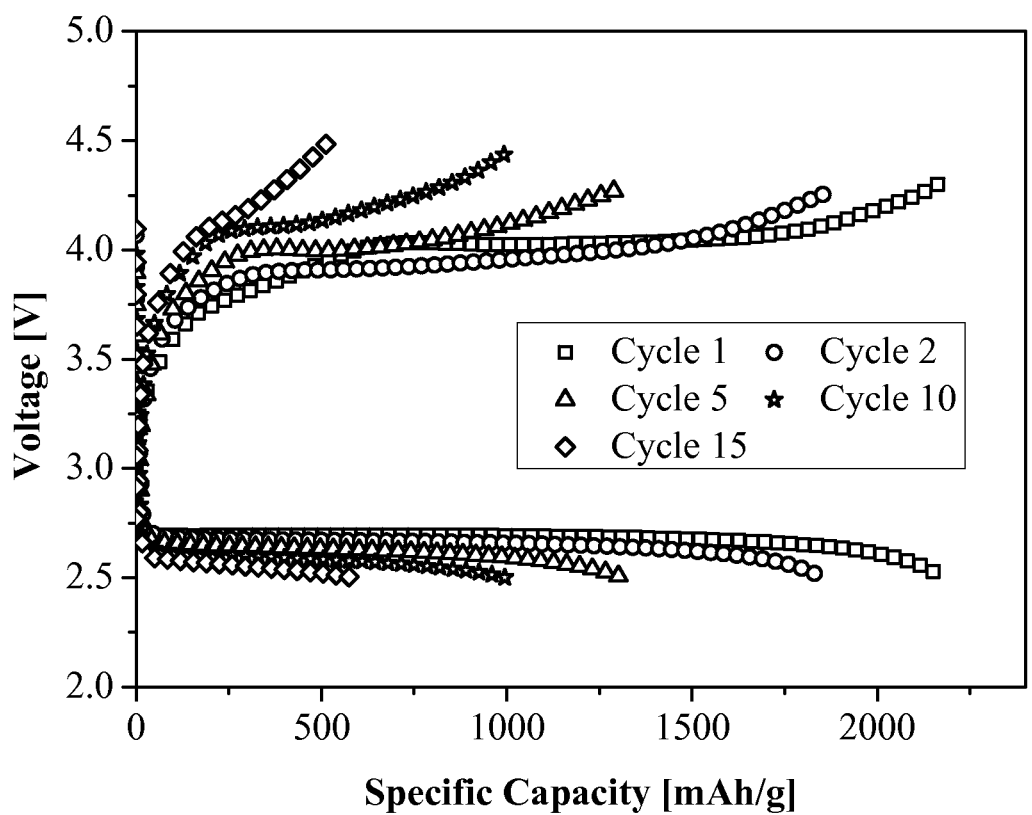
FIG. 14 is a detailed voltage profile of cells, under voltage-controlled mode, prepared with a cathode of 5% Cu-5% Pt—C, according the examples.

Detailed voltage profiles of 5% Cu-x % Pt—C (x=2.5, 5) cathodes are shown FIGS. 8 and 9. The voltage profiles indicate that the cell performance and cyclability were significantly improved with the catalytic activity of the bi-metallic core shell nanoparticles. After the capacity-controlled cycles, the cathodes were observed by SEM, with images shown in FIG. 10. The porous surface of the bare carbon (FIG. 10(b)) and 5% Cu—C (FIG. 10(d)) cathode are completely recovered. The other cathodes (FIGS. 10(c), 10(e), and 10(f)), which contain Pt in the catalyst nanoparticles, seem as porous as the pristine cathode (FIG. 10(a)). For these cells, one possible cause of the failure is the degradation of the Li-metal anode by an oxygen crossover effect, which results in the formation of the irreversible product LiOH.

Equal-capacity charging mode was conducted on the cells using 5% Cu-x % Pt—C (x=2.5, 5) cathodes, in an attempt to fully recover the discharge product. The 5% Cu-x % Pt—C (x=2.5, 5) cathodes exhibited the best performance in the capacity-controlled mode. In the equal-capacity charging mode, the cut-off charging condition was specified so that the charging capacity matched the previous discharging capacity, while the charge potential was limited to 4.5 V. Under this mode, the charge of the cell was terminated when either of these conditions was achieved. FIGS. 11-14 show the cycle performance of the Li—$O_2$ cells. Approximately 2200 mAh/g was recovered at the 3.2 V plateau during the charge on the 5% Cu-2.5% Pt—C cathode, and at approximately a 4 V plateau during the charge on the 5% Cu-5% Pt—C cathode. It is worthwhile noting that the charge overpotential of the 5% Cu-2.5% Pt—C cathode remains low under the deep discharge/charge mode. However, the deep discharge leads to high charge potential and poor cycle performance once an accumulation of the insulating discharge products, particularly $Li_2O_2$, impedes the transportation of lithium ions, oxygen, and electrons in the electrode.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A metal-air battery comprising an anode, a cathode catalyst, and an electrolyte;
    wherein:
        the cathode catalyst comprises core-shell nanoparticles on a carbon support;
        a core of the core-shell nanoparticles comprises platinum metal; and a shell of the core-shell nanoparticles comprises copper metal; wherein: the core-shell nanoparticles have a weight ratio of the copper metal to the platinum metal from about 4% to about 6% copper to from about 2% to about 12% platinum, with a remaining percentage being the carbon support;
        the electrolyte comprises an aprotic solvent selected from the group consisting of an ether-based solvent, a fluorinated ether-based solvent, an oligo(ethylene oxide) solvent, and a mixture of any two or more thereof; and
        the aprotic solvent is free of carbonate solvents.

2. The metal-air battery of claim 1, wherein the ratio is about 5 wt % copper:about 2.5 wt % platinum.

3. The metal-air battery of claim 1, wherein the ratio is about 5 wt % copper:about 5 wt % platinum.

4. The metal-air battery of claim 1, wherein the ratio is about 5 wt % copper:about 10 wt % platinum.

5. The metal-air battery of claim 1, wherein the carbon support comprises synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene.

6. The metal-air battery of claim 1, wherein the anode comprises lithium, sodium, potassium, magnesium, or zinc.

7. The metal-air battery of claim 1, wherein the electrolyte further comprises a lithium salt.

8. The metal-air battery of claim 7, wherein the aprotic solvent is selected from the group consisting of: glyme, diglyme, tetrahydrofuran, tetraethylene glycol dimethylether, tri(ethylene glycol)-substituted methyltrimethyl silane, ethylene glycol-substituted methyltrimethyl silane, di(ethylene glycol)-substituted methyltrimethyl silane, acetonitrile, dimethyl sulfoxide, dimethylformamide, triethyl phosphate, N,N-dimethylacetamide, N-methyl pyrrolidone, methoxybenzene, and an ionic liquid.

9. The metal-air battery of claim 1 which is a lithium-air battery.

10. The metal-air battery of claim 1, wherein during operation at least some of the copper is present as $Cu^{1+}$.

11. The metal-air battery of claim 1, wherein the aprotic solvent is selected from the group consisting of: glyme, diglyme, tetrahydrofuran, tetraethylene glycol dimethylether, tri(ethylene glycol)-substituted methyltrimethyl silane, ethylene glycol-substituted methyltrimethyl silane, di(ethylene glycol)-substituted methyltrimethyl silane, acetonitrile, dimethyl sulfoxide, dimethylformamide, triethyl phosphate, N,N-dimethylacetamide, N-methyl pyrrolidone, methoxybenzene, and an ionic liquid.

12. The metal-air battery of claim 1, wherein the aprotic solvent is selected from the group consisting of: tetraethylene glycol dimethylether, tri(ethylene glycol)-substituted methyltrimethyl silane, ethylene glycol-substituted methyltrimethyl silane, and di(ethylene glycol)-substituted methyltrimethyl silane.

13. The metal-air battery of claim 1, wherein the aprotic solvent is selected from the group consisting of: tri(ethylene glycol)-substituted methyltrimethyl silane, ethylene glycol-substituted methyltrimethyl silane, and di(ethylene glycol)-substituted methyltrimethyl silane.

* * * * *